United States Patent [19]

Thorsten

[11] Patent Number: 4,722,587
[45] Date of Patent: Feb. 2, 1988

[54] FIBER BUNDLE TECHNIQUE FOR ALIGNING LIGHT EMITTERS WITHIN CONNECTORIZED EMITTER PACKAGES

[75] Inventor: Neal H. Thorsten, Lebanon, N.J.

[73] Assignee: American Telephone and Telegraph Company AT&T Bell Laboratories, Murray Hill, N.J.

[21] Appl. No.: 834,231

[22] Filed: Feb. 27, 1986

[51] Int. Cl.⁴ .............................................. G02B 6/42
[52] U.S. Cl. .................... 350/96.20; 356/153
[58] Field of Search ...................... 250/227; 350/96.15, 350/96.20; 356/73.1, 153, 400, 401

[56] References Cited

U.S. PATENT DOCUMENTS

| | | | |
|---|---|---|---|
| 3,999,841 | 12/1976 | Dakss et al. | 350/96.21 X |
| 4,394,061 | 7/1983 | Schroeder | 350/96.20 |
| 4,433,898 | 2/1984 | Hasiri | 350/96.20 X |
| 4,495,396 | 1/1985 | Fegley et al. | 356/153 X |
| 4,509,827 | 4/1985 | Cowen et al. | 350/320 |
| 4,548,466 | 10/1985 | Evans et al. | 350/96.20 |
| 4,562,344 | 12/1985 | Mihara et al. | 250/227 X |
| 4,564,261 | 1/1986 | Kojima et al. | 350/96.24 |

OTHER PUBLICATIONS

"Multispot Laser Photocoagulation . . . ", *Applied Optics*, vol. 21, No. 19, Oct. 1982, H. Fujii et al., pp. 3437-3442.

*Primary Examiner*—Eugene R. LaRoche
*Assistant Examiner*—James C. Lee
*Attorney, Agent, or Firm*—Wendy W. Koba

[57] ABSTRACT

A technique is disclosed for aligning a packaged optical emitter with its associated transmission fiber which provides peak power coupling between the emitter and the fiber. The technique uses a connectorized coherent fiber bundle which is inserted in the fiber connecting portion of the package such that it accepts the emitter output radiation at the same Z-axis position as the single fiber it simulates. The fiber bundle has a fiducial marking on one end which coincides with the core region of the single fiber. Both the emission pattern and the fiducial marking are displayed on a video monitor and the emitter subassembly is moved around inside the package until the emission pattern coincides with the fiducial, thus indicating alignment of the emitter with the associated transmission fiber.

37 Claims, 3 Drawing Figures

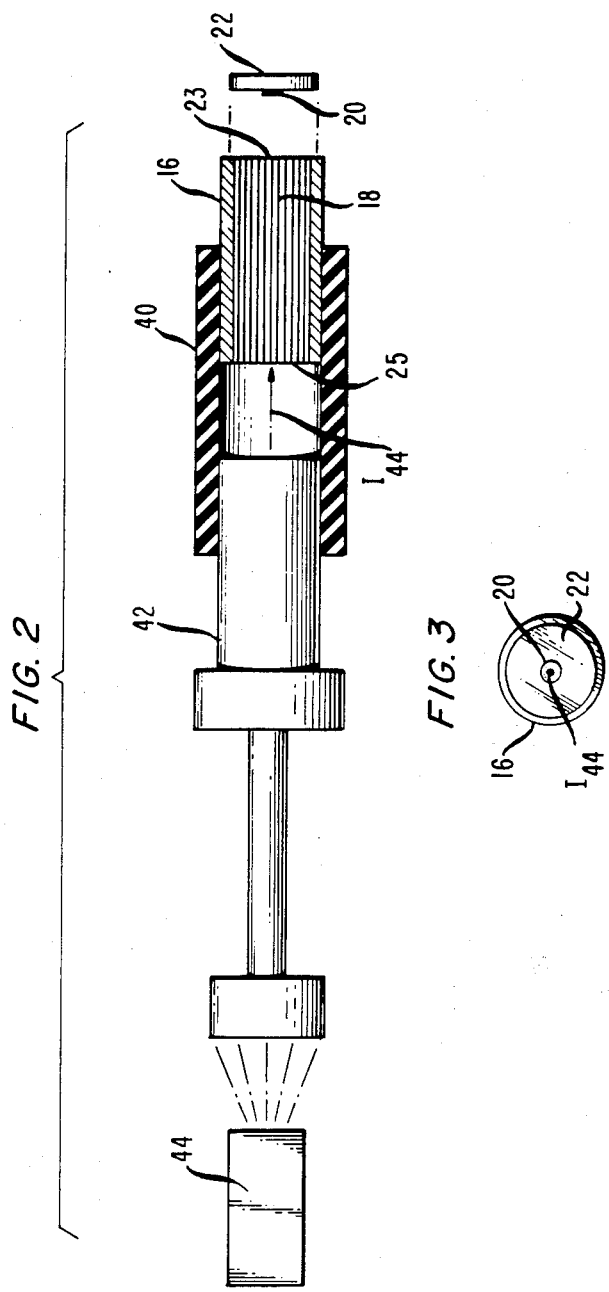

FIBER BUNDLE TECHNIQUE FOR ALIGNING LIGHT EMITTERS WITHIN CONNECTORIZED EMITTER PACKAGES

BACKGROUND OF THE INVENTION

1. Field of the Invention

The present invention relates to a technique for aligning light emitters directly to the connector portion of the connectorized emitter package, and, more particularly, to such a technique which uses a coherent fiber bundle to achieve alignment.

2. Description of the Prior Art

An essential requirement in optical comunication systems is that the communication fiber be aligned as closely as possible with the center of the light beam from the emitter. The emitters used in such systems are typically packaged light emitting diodes (LEDs) or laser diodes. The conventional alignment process involves coupling a connectorized fiber to the package containing the emitter and monitoring the optical output power through the fiber with a meter. The position of the emitter is then adjusted, using either a micromanipulator or a pair of set screws, to obtain maximum light throughput. U.S. Pat. No. 4,548,466 issued to D. S. Evans on Oct. 22, 1985 describes one such process.

The above-described process, although accurate in achieving alignment, is often very time-consuming and requires an operator to perform the procedure. Additionally, if the light from the emitter initially focused on the test fiber is severely off-axis, the power meter reading will be very low and may not even record a power level at all. This results in requiring additional manipulations to try to obtain maximum power, where the actual fault may lie in a defective emitter, thus adding even more time delay to the alignment process.

Thus, a need remains in the prior art for a better method of aligning optical fibers to emitters which is relatively simple, inexpensive, and efficient.

SUMMARY OF THE INVENTION

The problem remaining in the prior art has been solved in accordance with the present invention which relates to a technique for aligning light emitters directly to the connector portion of a connectorized emitter package and, more particularly, to such a technique which utilizes a coherent fiber bundle to achieve alignment.

It is an aspect of the present invention to utilize a coherent fiber bundle and an associated video monitor or display to perform the emitter-to-fiber alignment. The ends of the fiber bundle are prepared with one end placed so that it receives light at the same Z-axis position as the single fiber within the mating connector plug it simulates. A centered fiducial mark is formed on one end of the coherent fiber bundle and the emitter subassembly is translated in the package until the center of the emission pattern from the emitter is coincident with the fiducial.

An additional aspect of the present invention is to provide an alignment method which can be utilized when the initial alignment is severely off-axis. By utilizing a coherent fiber bundle, instead of a single fiber, the emission pattern, no matter how far off-axis, will be detected by the fiber bundle and appear on the monitor or display.

Yet another aspect of the present invention is the ability to include microprocessor control of the alignment process, where the information sent to the monitor is evaluated using grey scale analysis and the resulting information regarding the misalignment between the spot and the fiducial is then sent to an automatic translator which is connected to the emitter subassembly and will function to move the subassembly until alignment is achieved. Grey scale analysis provides better alignment resolution than is possible with conventional human eye evaluation.

A further aspect of the present invention relates to using one or more tapered coherent fiber bundles, in place of a standard coherent fiber bundle, where the tapered sections provide sufficient magnification of the emission pattern so as to eliminate the need for a separate magnifying element to be included between the fiber bundle and the video camera.

These and other aspects of the present invention will become apparent during the course of the following discussion and by reference to the accompanying drawings.

BRIEF DESCRIPTION OF THE DRAWINGS

Referring now to the drawings, where like numerals represent like parts in several views:

FIG. 2 illustrates an exemplary procedure for forming the alignment fiducial on an end of the coherent fiber bundle; and FIG. 3 illustrates an end view of an aligned fiducial.

DETAILED DESCRIPTION

Figure 1:
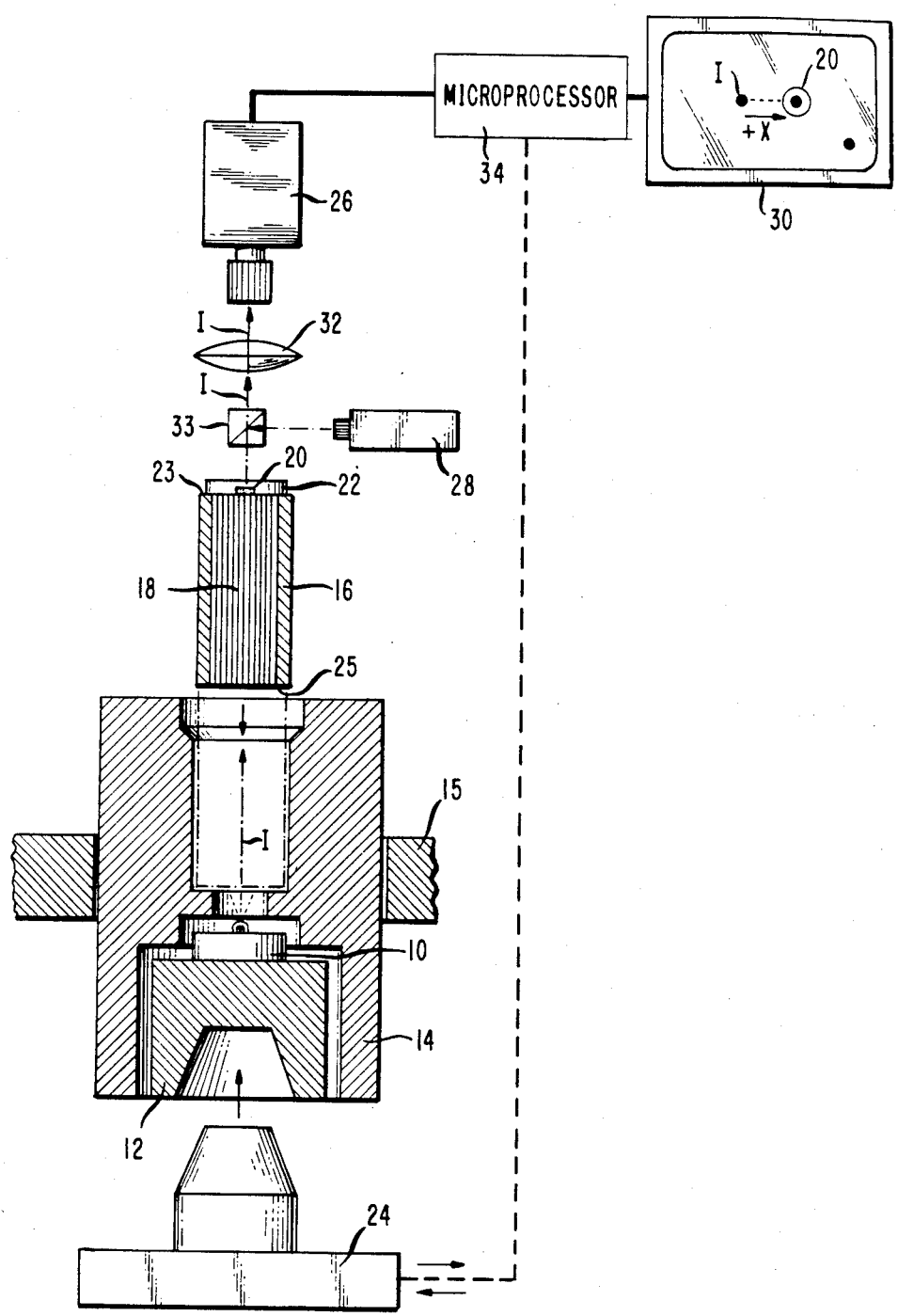
FIG. 1 illustrates a system for aligning a light emitter within a connectorized package using the coherent fiber bundle technique of the present invention.

An alignment system using the fiber bundle process of the present invention is illustrated in FIG. 1. An emitter 10, which may be an LED, laser, or any other light source, is mounted on an emitter subassembly 12 and positioned in a transmitter package 14. A clamping fixture 15 is utilized to hold the package motionless during the alignment process. A fiber connector simulator 16 including a coherent fiber bundle 18 is inserted into package 14, as shown by the arrow in FIG. 1 so as to expose an endface 25 of fiber bundle 18 to the emitting surface of device 10 at the same Z-axis position as the simulated connector half that normally carries only a single fiber. In the practice of the present invention, any conventional coherent fiber bundle may be employed, where the bundle is permanently fixed along the center axis of simulated connector 16. Two particular classes of fiber bundles, flexible and rigid, presently exist and either is suitable for the purposes of the alignment process of the present invention as long as the light signal remains coherent as it travels along the length of the bundle.

It is to be noted that although the following description of the present invention will discuss the use of a rigid fiber bundle, this description is exemplary only and any type of coherent fiber bundle may be used to perform the alignment process of the present invention. Rigid fiber bundles are conventionally formed by grouping together individual fibers and drawing the group down to a given diameter. A number of groups are then clustered together and drawn down again using the same technique, where this sequence of grouping and drawing is repeated until the desired fiber bundle (in terms of number of fibers, bundle size, etc.) is attained. A typical rigid coherent fiber bundle may be approximately 1mm in diameter and include 30,000 separate fibers.

Returning to the description of the alignment process, a fiducial marking 20, which may be formed on a glass piece 22, is positioned on an end 23 of fiber bundle rod 18 opposite to emitter 10, as shown on FIG. 1. In an alternative arrangement, fiducial 20 may be formed on end 25 of fiber bundle 18. Glass 22 is attached to bundle 18 so that fiducial marking 20 is aligned to coincide with maximum light output. An exemplary scheme for positioning glass 22 on coherent fiber bundle rod 18 will be discussed in detail hereinafter in association with FIG. 2. Fiducial marking 20 is illustrated in FIG. 1 as comprising a circle. However, it is to be understood that any suitable alignment marking may be utilized in practicing the present invention, where markings which yield a high contrast and resolution video image are preferable. Other various markings include, but are not limited to, a set of four dots formed to outline a square, a series of dots disposed to form a pair of vertical parallel lines, a cross, or an X.

In order to align emitter 10 with coherent fiber bundle 18, a translator 24 is used. As shown in FIG. 1, translator 24 is positioned to mate with emitter subassembly 12, as indicated by the arrow, and provides x-y movement of subassembly 12 to achieve proper alignment. As will be discussed below, translator 24 may either be manually controlled or designed to respond to computer control signals.

When emitter 10 is activated, its light output appears as a spot of light on end 25 of fiber bundle 18. This spot image I is exactly transferred to end 23 of coherent fiber bundle rod 18 as shown. The image of light spot I is seen by a camera 26 positioned behind bundle 18 and fiducial 20 so that image I is displayed as the pattern illustrated on a video monitor 30. Although camera 26 is shown in FIG. 1 to be aligned substantially along the axis of fiber bundle 18 this condition is not necessary; in fact camera 26 can be positioned substantially off-axis and still achieve the same high alignment resolution. A light source 28 and beamsplitter 33 are included in the alignment apparatus to illuminate fiducial 20 so that a clear representation of fiducial 20 is also displayed on video monitor 30.

Referring to the display on monitor 30, it is seen that light beam pattern I is misaligned from fiducial 20 in the −X direction. Therefore, translator 24 is activated to move emitter subassembly 24 in the +X direction until pattern I is aligned with fiducial 20, as indicated by the pattern $I_a$. In accordance with the coherent fiber bundle alignment process of the present invention, a beam pattern which is severely misaligned will still be displayed on monitor 30, since the outer fibers forming bundle 18 will intercept the light output from emitter 10. One such severely off-axis beam pattern is illustrated as I' on monitor 30 in FIG. 1. A series of X and Y translations of subassembly 12 may then be performed to bring pattern I' into alignment with fiducial 20.

Once alignment is completed, emitter subassembly 12 is fixed in place, preferably epoxied, inside package 14. Simulated connector 16 containing fiber bundle 18 is then removed and a connectorized single fiber (not shown) is inserted in its place. As long as the geometry of the connector for the single fiber is identical to the simulated connector 16 geometry used with fiber bundle 18, the single fiber will be aligned with emitter 10.

In order to display a sufficiently large video image to perform the alignment, a magnifying element 32 may be inserted in the alignment apparatus between the end of fiber handle 18 and camera 26. As an alternative to using magnifying element 32, coherent fiber bundle rod 18 may be formed as a tapered fiber bundle, that is, a fiber bundle drawn in a manner such that the outer diameter of one end is less than the outer diameter of the opposite end, where the ratio of the outer diameters yields the magnification factor. To be used as a magnifying element in the alignment process of the present invention, the smaller end of the taper is positioned in line with emitter 10 and the larger end is fitted with glass piece 22. More than one tapered bundle can be used in practicing the present invention. For example, two tapered bundles, each with a magnification of 6/1, may be used together in optical series to yield a total magnification of 36/1. This arrangement utilizing one or more tapered fiber bundles is considered a preferable alternative over using a separate magnifying element 32, since differences between points of sharp focus between image I and fiducial 20 due to chromic aberration through the elements of lens system will be eliminated. As another alternative magnification arrangement, a combination of tapered fiber bundles and separate magnifying elements may be used together in achieving alignment in accordance with the present invention.

As mentioned above, the process of manually adjusting translator 24 to align light pattern I with fiducial 20 can be replaced with an automatic alignment system. To accomplish this, a microprocessor 34 may be inserted in the path between camera 26 and video monitor 30. Microprocessor 34 may comprise any system well known in the art which is suited for the purposes of the present invention. That is, microprocessor 34 functions to compare a set of data points related to the centroid position of fiducial 20 and compares the incoming information related to the centroid position of light pattern I to that of fiducial 20. Gray scale evaluation of relative centroid is the preferred method of performing this comparison, since significantly higher resolution in alignment can be obtained as compared with other microprocessor controlled alignment evaluation techniques. Once microprocessor 34 determines the amount of misalignment, this information is coded into x-y positioning data which is then transmitted, as indicated by the dotted line in FIG. 1, to translator 24. For this particular arrangement, therefore, translator 24 must be adapted to respond to this output signal from microprocessor 34. Such systems are well-known in the art and need not be described here to achieve an understanding of the working of the present invention.

FIG. 2 illustrates one exemplary arrangement for fixing glass piece 22 with fiducial marking 20 onto end 23 of coherent fiber bundle rod 18. As shown, fiber bundle 18 is permanently fixed in connector simulator 16 and connector simulator 16 is positioned in a precision optical coupler 40, shown as a ferrule in FIG. 2. A compatible, pre-aligned light emitting arrangement 42, for example a terminated single mode optical fiber, is positioned in ferrule 40 opposite to coherent fiber bundle 18. A single mode fiber will provide a centered emission pattern within ±1 μm accuracy, well within acceptable limits for aligning fiducial 20. A light source 44 is connected to the free end of arrangement 42, where any light source is suitable for achieving fiducial alignment. After both connectors 42 and 18 and positioned in ferrule 40, a light source 44 is activated and its pattern $I_{44}$ will illuminate end 23 of fiber bundle 18, as shown in the associated exploded end view of FIG. 3.

Glass piece 20 is then placed against end 23 and positioned until fiducial 20 coincides with the light pattern I₄₄. Once this is achieved, glass 22 is fixed to fiber bundle 18. In an alternative arrangement, a system could be employed for fixing glass 22 on end 25 of bundle 18. It is to be understood, however, that these various other arrangements exist for providing alignment of fiducial 20 with coherent fiber bundle 18, and are not to be considered as limiting the scope of the present invention.

What is claimed is:

1. A method of aligning a light emitting device within a housing such that the core region of a transmission optical fiber to be inserted in said housing is aligned with the output light emission pattern from said light emitting device, said light emitting device disposed on a subassembly and said subassembly being initially positioned in a first predefined opening in said housing, the method comprising the steps of:
   (a) positioning a coherent optical fiber bundle in a second opening in said housing, said second opening designated for the later placement of said transmission optical fiber, said coherent optical fiber bundle including a first end positioned to receive said output light emission from said light emitting device and having a fiducial marking formed on one end thereof, said fiducial marking formed to coincide with the core region of said transmission optical fiber;
   (b) activating said light emitting device;
   (c) viewing simultaneously said fidicual marking and said output light emission pattern;
   (d) translating said light emitting devie subassembly until said output light emission pattern coincides with said fiducial marking, such coincidence indicating alignment of said light emitting device with the core region of said transmission optical fiber which may then be inserted in place of said coherent optical fiber bundle.

2. The method according to claim 1 wherein said method comprises the additional step of:
   (e) permanently fixing the light emitting device subassembly in the housing in the position which yielded coincidence of the output light emission pattern and the fiducial marking.

3. The method according to claims 1 or 2 wherein in performing step (c) a magnified image of both the output light emission path and the fiducial marking is viewed.

4. The method according to claim 3 wherein the magnification is achieved utilizing a separate magnifying element positioned behind the fiducial marking.

5. The method according to claim 3 wherein the magnification is achieved by utilizing a plurality of N tapered coherent fiber bundles connected in optical series in step (a), where the first one end of the plurality of N tapered coherent fiber bundles comprises a significantly smaller outer diameter than the second end, the ratio of outer diameters multiplied by N indicating the total magnification factor.

6. The method according to claim 5 wherein $N=1$.

7. The method according to claim 5 wherein $N>1$.

8. The method according to claim 3 wherein the magnification is achieved by utilizing a plurality of N tapered coherent fiber bundles connected in optical series in in step (a), in combination with a separate magnifying element positioned behind the fiducial marking.

9. The method according to claims 1 or 2 wherein in performing step (c), a video camera is positioned beyond the fiducial marking and is connected to a video monitor such that the output light emission pattern and the fiducial marking are displayed as images on the video monitor.

10. The method according to claim 9 wherein a light source is used to illuminate the fiducial marking to present a high contrast and high resolution image on the video monitor.

11. The method according to claims 1 or 2 wherein in performing step (d), an x-y translating means is coupled to the light emitting device subassembly to perform movements of said subassembly required to provide alignment.

12. The method according to claims 1 or 2 wherein in performing step (d), automated alignment means are utilized to translate the light emitting device subassembly until coincidence is achieved.

13. The method according to claim 12 wherein the automated alignment means comprises
   a mircroprocessor responsive to an input signal representative of the output light emission pattern and capable of comparing said input signal to a pattern representative of the location of the fiducial marking, said microprocessor for providing as an output a misalignment signal representative of the amount of misalignment between said input signal and said fiducial marking pattern; and
   automated translating means responsive to the microprocessor output signal for translating the emitter subassembly in response to said microprocessor output signal.

14. The method according to claim 12 wherein gray scale processing of both the input signal and the fiducial image pattern is used to generate the output signal.

15. The method according to claims 1 or 2 wherein in performing step a), the coherent optical fiber bundle includes a glass endpiece attached to one end of said bundle, where the fiducial marking is formed on the glass endpiece.

16. The method according to claim 15 wherein the glass endpiece is attached to the second end of the coherent optical fiber bundle.

17. The method according to claims 1 or 2 wherein the fiducial marking comprises a circle.

18. The method according to claims 1 or 2 wherein the light emitting device comprises a laser.

19. The method according to claims 1 or 2 wherein the light emitting device comprises a light emitting diode.

20. Apparatus for aligning a light emitting device within a housing such that the core of a transmission optical fiber to be inserted in said housing will be aligned with the output light emission pattern from said light emitting device, said light emitting device disposed on a subassembly and said subassembly being initially positioned in a first predetermined opening in said housing, said apparatus comprising
   a coherent optical fiber bundle positioned in a second opening in said housing, said second opening designated for the later placement of said transmission optical fiber, said coherent optical fiber bundle including a first end positioned to receive said output light emission from said light emitting device and having a fiducial marking formed on one end thereof, said fiducial marking formed to coincide with the core region of said transmission optical fiber;

means for activating the light emitting device so that said light emitting device generates its associated output light emission;

means for simultaneously viewing said fiducial marking and said output light emission pattern; and means for translating said light emitting device subassembly until said output light emission pattern coincides with said fiducial marking, such coincidence indicating alignment of said light emitting device with the core region of said transmission optical fiber which may then be inserted in place of said coherent optical fiber bundle.

21. Apparatus as defined in claim 20 wherein the apparatus further comprises
magnifying means for enlarging the viewed images of said fiducial marking and said output light emission pattern.

22. Apparatus as defined in claim 21 wherein the magnifying means comprises a magnifying element disposed behind the fiducial marking.

23. Apparatus as defined in claim 21 wherein the magnifying means comprises utilizing a plurality of N tapered coherent optical fiber bundles connected in optical series, where the first end of the plurality of N tapered coherent fiber bundles comprises a significantly smaller outer diameter than the outer diameter of the second end, the ratio of outer diameters multiplied by N indicating the total magnification factor.

24. Apparatus as defined in claim 23 wherein $N=1$.

25. Apparatus as defined in claim 23 wherein $N>1$.

26. Apparatus as defined in claim 21 wherein the magnification means comprises both a plurality of N tapered coherent fiber bundles, and a separate magnifying element positioned behind the fiducial marking.

27. Apparatus as defined in claim 20 wherein the viewing means comprises
a video camera positioned beyond the fiducial marking; and
a video monitor connected to said video camera, the images of the output light emission pattern and the fiducial marking being displayed on said video monitor.

28. Apparatus as defined in claim 27 wherein the viewing means further comprises a light source for illuminating the fiducial marking to provide high contrast and high resolution image on the video monitor.

29. Apparatus as defined in claim 28 wherein the microprocessor sues gray scale evaluation of both the input signal and the fiducial marking pattern to generate the output signal.

30. Apparatus as defined in claim 20 wherein the translating means comprises an x-y translator attached to the light emitting device subassembly to perform movements of said subassembly in both x and y directions until alignment is achieved.

31. Apparatus as defined in claim 20 wherein the translating means comprises an automated translator for moving the light emitting device subassembly until alignment is achieved.

32. Apparatus as defined in claim 31 wherein the automated translator comprises
a microprocessor responsive to an input signal representative of the output light emission pattern and capable of comparing said input signal to a pattern representative of the location of the fiducial marking, said microprocessor for providing as an output a misalignment signal representative of the amount of misalignment between said input signal and said fiducial marking pattern; and
automated translating means responsive to the microprocessor output signal for translating the emitter subassembly in response to said microprocessor output signal.

33. Apparatus as defined in claim 20 wherein the coherent optical fiber bundle includes a glass endpiece attached to one end of said fiber bundle, where the fiducial marking is forming on the glass endpiece.

34. Apparatus as defined in claim 33 wherein the glass endpiece is attached to the second end of the coherent optical fiber bundle.

35. Apparatus as defined in claim 20 wherein the fiducial marking comprises a circle.

36. Apparatus as defined in claim 20 wherein the light emitting device is a laser.

37. Apparatus as defined in claim 20 wherein the light emitting device is a light emitting diode.

* * * * *